United States Patent
Lee et al.

(10) Patent No.: US 6,909,888 B2
(45) Date of Patent: Jun. 21, 2005

(54) SYSTEM FOR ESTIMATING TRAFFIC RATE OF CALLS IN WIRELESS PERSONAL COMMUNICATION ENVIRONMENT AND METHOD FOR THE SAME

(75) Inventors: Ki-Dong Lee, Seoul (KR); Yong-Hoon Cho, Daejeon (KR); Ho-Jin Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 424 days.

(21) Appl. No.: 10/270,702

(22) Filed: Oct. 14, 2002

(65) Prior Publication Data

US 2003/0236084 A1 Dec. 25, 2003

(30) Foreign Application Priority Data

Jun. 20, 2002  (KR) .................................... 2002-0034533

(51) Int. Cl.$^7$ ............................................. H04M 11/00
(52) U.S. Cl. ....................... 455/405; 455/423; 455/450; 370/235
(58) Field of Search ................................ 455/405, 423, 455/450, 424, 425, 428, 455; 370/229, 230, 230.1, 231–235

(56) References Cited

U.S. PATENT DOCUMENTS

| | | | | |
|---|---|---|---|---|
| 5,583,857 A | * | 12/1996 | Soumiya et al. | 370/233 |
| 6,061,331 A | * | 5/2000 | Conway et al. | 370/232 |
| 6,269,331 B1 | * | 7/2001 | Alanara et al. | 704/205 |
| 6,331,986 B1 | * | 12/2001 | Mitra et al. | 370/468 |
| 6,549,517 B1 | * | 4/2003 | Aweya et al. | 370/236.1 |
| 6,549,587 B1 | * | 4/2003 | Li | 375/326 |
| 6,757,540 B1 | * | 6/2004 | Lehtinen | 455/446 |
| 6,765,931 B1 | * | 7/2004 | Rabenko et al. | 370/493 |

FOREIGN PATENT DOCUMENTS

WO      WO 00/01182      1/2000

* cited by examiner

Primary Examiner—CongVan Tran
(74) Attorney, Agent, or Firm—Blakely Sokoloff Taylor & Zafman

(57) ABSTRACT

A system for estimating a traffic rate of calls in system environments providing wireless personal communication services on an open queuing network includes modules that have functions of making three sets of nodes, "log_off", "log_on" and "active" according to the status of communication terminal equipment, observing the number of "log_on" and "active" terminals by minimum areas of each wireless personal communication service, and predicting traffic probability by minimum areas. More specifically, the present invention includes: a traffic parameter observation module for making a set of nodes and collecting observations measured in real time on the respective nodes; a regression analysis module for performing a regression analysis of the observations to assume a prediction model for traffic rates of calls and to estimate the traffic rates of internal-to-internal or external-to-internal calls; and a resource allocation control module for determining whether to allocate resources and how much of the resources to allocate according to the traffic rates of internal-to-internal or external-to-internal calls.

14 Claims, 4 Drawing Sheets

SYSTEM FOR ESTIMATING TRAFFIC RATE OF CALLS IN WIRELESS PERSONAL COMMUNICATION ENVIRONMENT AND METHOD FOR THE SAME

BACKGROUND OF THE INVENTION (a) Field of the Invention

The present invention relates to a system for providing wireless personal communication services to multiple users via multiple access nodes. More specifically, the present invention relates to a system for estimating a traffic rate of calls in wireless personal communication environments, and a method for the same.

(b) Description of the Related Art

A method for estimating a traffic rate of calls according to an example of the prior art is embodied on the assumption that information including area of a cell, length of a cell boundary, user density and average speed in the cell, or width of a path (or a number of lanes) is previously known in the cellular communication system.

But the class of cells is varied due to random propagation environments, and, even without a change in the class of cells, it is necessary for companies to estimate the corresponding area for hundreds/thousands of cells in order to apply the estimation methods for traffic rates of calls. Thus this estimation method is inappropriate for actual applications.

A method for estimating a traffic rate of calls according to another example of the prior art uses area of cell, length of cell boundary, user density, users' average speed, or width of path in cellular communication systems.

Data necessary for the use of this method in actual systems may include topographical area of a cell, length of the cell boundary, and users' average speed, and estimating these data is a prerequisite for estimation of traffic rates of calls. In addition, some information about the class of cells, such as the area of the cell, is necessary for calculation of data about the length of path, or the like.

In this regard, the class of cells is very difficult to estimate and information about users nearing a particular cell for a large number of cells is attainable only at a high cost.

Hence, the conventional methods for estimating a traffic rate of calls that involve analyzing necessary data and estimating traffic rates of calls based on the analyzed data are not easy to apply to actual systems. Moreover, the traffic rates of calls cannot be provided as a reasonable source for optimized resource allocation because invalid data can also be used for estimating the traffic rates of calls.

SUMMARY OF THE INVENTION

It is an object of the present invention to solve the problems with the prior art and to provide a system for estimating a traffic rate of calls in wireless personal communication environments, and a method for the same, that involve classifying known data for estimation of traffic rates of calls and estimating the traffic rates of calls by regression analysis using data selected as valid explanatory variables, to provide the traffic rates of calls as a reasonable source for optimized operation of wireless resources, wherein they are readily applied to actual systems.

To achieve the object of the present invention, a system is provided for estimating a traffic rate of calls in wireless personal communication environments that includes: a traffic parameter observation module for making a set of adjacent nodes in an open queuing network and collecting real-time observations for observing the number of active objects on each node and the number of objects present in a corresponding area; a regression analysis module for performing a regression analysis of the observations collected by the traffic parameter observation module to assume a prediction model for traffic rates of calls and to estimate traffic rates of internal-to-internal or external-to-internal calls; and a resource allocation control module for determining whether to allocate resources and how much of the resources to allocate according to the traffic rates of internal-to-internal or external-to-internal calls estimated by the regression analysis module.

Preferably, the set of adjacent nodes made by the traffic parameter observation module includes three sets of nodes, "log_off", "log_on", and "active", defining the status of communication terminal equipment.

Preferably, the traffic parameter observation module uses, as the real-time observations, a transition request rate $b_i$ from an external node i to an internal node i and a corresponding rate of accepted transitions $\beta_i$, a transition request rate $A_i$ from the internal node i to the external node i and a corresponding rate of accepted transitions $\gamma_i$, a transition request rate $A_{ji}$ from each internal node j adjacent to the internal node i to the internal node i, and the number of objects $g_i$ present on the external node i.

Preferably, the regression analysis module assumes the prediction model for traffic rates of calls, estimates regression coefficients $\omega_0$, $\omega_{1j}(k)$, $\omega_{2j}(k)$, $z_{0,i}$, and $z_{1,i}(k)$ every time interval $T_{function}$ by using the observations collected by the traffic parameter observation module as past traffic parameter values to determine a regression function and then determine prediction values $\hat{A}_{ji}$ and $\hat{b}_i$ as future traffic parameter values by regression analysis using current observations whenever traffic occurs, thereby estimating the traffic rates of internal-to-internal or external-to-internal calls, and examines the validity of the individual coefficients.

Preferably, the regression analysis module determines estimators $\hat{A}_{ij}$ and $\hat{b}_i$ for the traffic rates of internal-to-internal or external-to-internal calls $A_{ij}$ and $b_i$ using regression equations for estimating traffic rates of calls, such as Equations 6 and 7.

Preferably, the resource allocation control module controls pairs of one internal node and one external node.

In another aspect of the present invention, a method is provided for estimating a traffic rate of calls in wireless personal communication environments that includes the steps of: (a) making a set of adjacent nodes in an open queuing network and examining the traffic status of the adjacent nodes; (b) performing a regression analysis using the examination result of step (a) as observations to determine a prediction model for traffic rates of calls and for estimating each coefficient of the prediction model; (c) examining the validity of each coefficient estimated in step (b) and modifying the prediction model for traffic rates of calls; and (d) predicting the traffic rates of calls using the prediction model modified in step (c) and the traffic status data estimated from the prediction model.

The method further includes the step of determining whether to allocate resources and how much of the resources to allocate according to the traffic rates of calls predicted in step (d).

Preferably, step (a) of making a set of adjacent nodes includes defining the status of communication equipment as three sets of node, "log_off", "log_on", and "active".

Preferably, step (a) of examining the traffic status of the adjacent nodes includes using, as real-time observations, a transition request rate $b_i$ from an external node i to an internal node i and a corresponding rate of accepted transitions $\beta_i$, a transition request rate $A_i$ from the internal node i to the external node i and a corresponding rate of accepted transitions $\gamma_i$, a transition request rate $A_{ij}$ from the internal node i to an internal node j, and the number of objects $g_i$ present on the external node i.

Step (b) of estimating each coefficient of the prediction model for traffic rates of calls includes: (b-1) estimating regression coefficients $\omega_0$, $\omega_{1,j}(k)$, $\omega_{2,j}(k)$, $Z_{0,i}$, and $z_{1,i}(k)$ every time interval $T_{function}$ by using the observations as past traffic parameter values to find a regression function; and (b-2) determining prediction values $\hat{A}_{ji}$, and $\hat{b}_i$ as future traffic parameter values by regression analysis using current observations whenever traffic occurs, thereby estimating traffic rates of internal-to-internal or external-to-internal calls.

Preferably, step (d) of predicting the traffic rates of calls includes determining estimators $\hat{A}_{ij}$ and $\hat{b}_i$ for the traffic rates of internal-to-internal or external-to-internal calls $A_{ij}$ and $b_i$ using regression equations for estimating traffic rates of calls, such as Equations 6 and 7.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
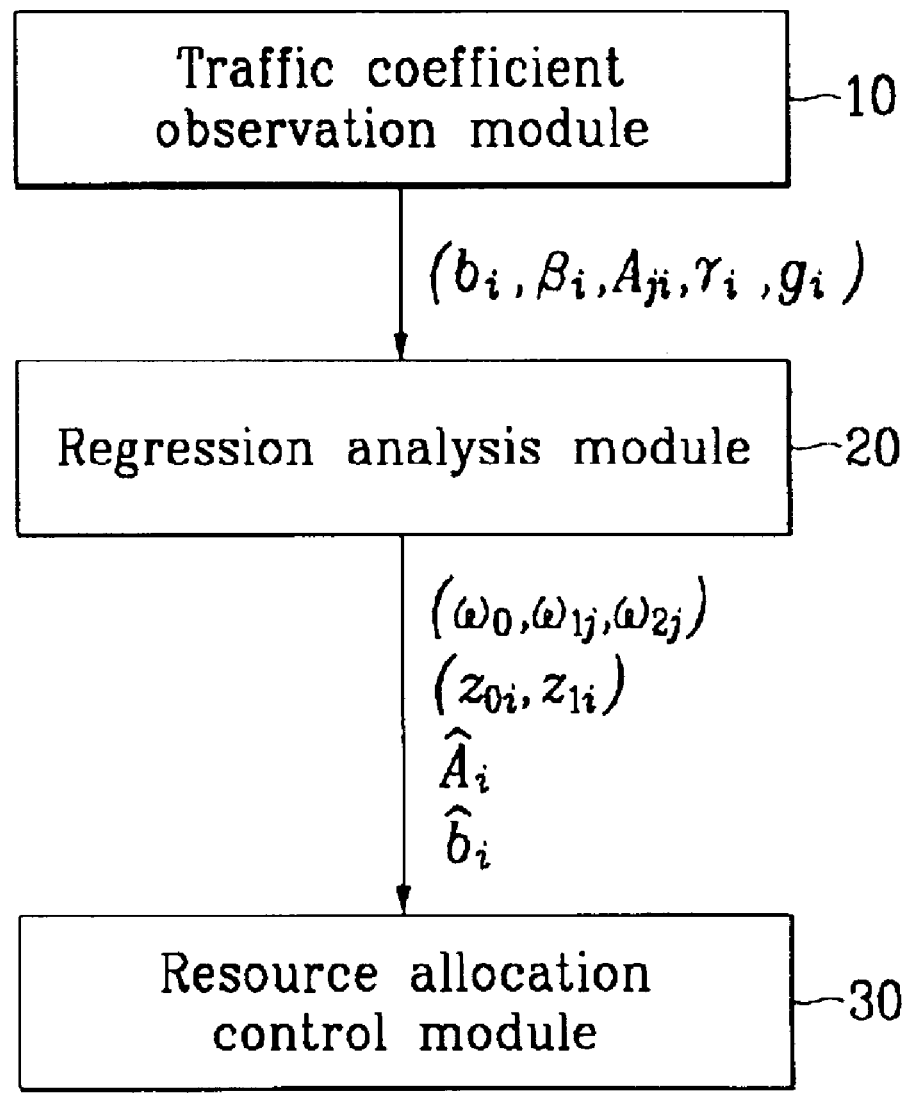
FIG. 1 is a schematic of a system for estimating a traffic rate of calls in wireless personal communication environments according to an embodiment of the present invention.

FIG. 1 is a schematic of a system for estimating a traffic rate of calls in wireless personal communication environments according to an embodiment of the present invention.

As shown in FIG. 1, the system for estimating a traffic rate of calls in wireless personal communication environments according to an embodiment of the present invention includes: a traffic parameter observation module 10 for making a set of adjacent nodes in an open queuing network and collecting real-time observations necessary for estimating traffic rates of calls; a regression analysis module 20 for performing a regression analysis of the observations collected by the traffic parameter observation module 10 to assume a prediction model for traffic rates of calls and to estimate the traffic rates of internal-to-internal or external-to-internal calls; and a resource allocation control module 30 for determining whether to allocate resources and how much of the resources to allocate according to the traffic rates of internal-to-internal or external-to-internal calls estimated by the regression analysis module 20.

The system according to the embodiment of the present invention comprises modules that have functions of making three sets of nodes, "log_off", "log_on", and "active" according to the status of communication terminal equipment, observing the number of "log_on" and "active" terminals by minimum areas of each wireless personal communication service, and predicting traffic probably occurring by minimum areas.

The prediction model for traffic rates of calls refers to modeling for estimating the traffic rates of calls using the number of active objects in the open queuing network and the number of objects present in a corresponding area.

The regression analysis module 20 assumes the prediction model for traffic rates of calls, performs an F-test to examine the validity of estimators estimated from the prediction model for traffic rates of calls, and then deletes the variables of coefficients that are found to be invalid in the F-test, to modify the prediction model for traffic rates of calls.

In this regard, the regression analysis module 20 uses the real-time observations from the traffic parameter observation module 10 as past traffic parameters to estimate future coefficients, that is, prediction values, and reports the prediction values to the resource allocation control module 30.

The resource allocation control module 30 controls pairs of one internal node and one external node, and, on traffic demand, allocates resources according to the policy designed for the demand.

Being limited in wireless resources, the resource allocation control module 30 cannot allocate resources unconditionally on traffic demand. On traffic demand, the resource allocation control module 30 has to make a yes/no determination on acceptance/rejection of resource allocation, or a similar quantal determination.

The above decision-making provided by the planned resource allocation policy of the resource allocation control module 30 is for the service providers to maximize the utilization of resources, while satisfying quality-of-service by traffic with limited resources.

Accordingly, node-based estimation of traffic rates of internal-to-internal or external-to-internal calls is analyzing and predicting the characteristics of parameters in the stochastic or random process with the uncertainty and randomness of traffic demand, more specifically, those characteristics such as the average frequency of traffic demands and the distribution of traffic demands.

The open queuing network system can maximize the utilization of wireless resources effectively and allocate valid resources despite the uncertainty of traffic demands, only when the resource allocation policy using the analysis and prediction information about the uncertainty is provided.

The traffic rates of internal-to-internal or external-to-internal calls in the open queuing network are provided as basic information for decision-making to realize effective resource allocation in the open queuing network with multiclass service support in which the stochastic variations of traffic demand causing a performance deterioration in application of resources possessed by the system are above the level of significance in the aspect of the use purpose, thereby overcoming short-term performance deterioration and securing long-term performance enhancement.

Figure 2:
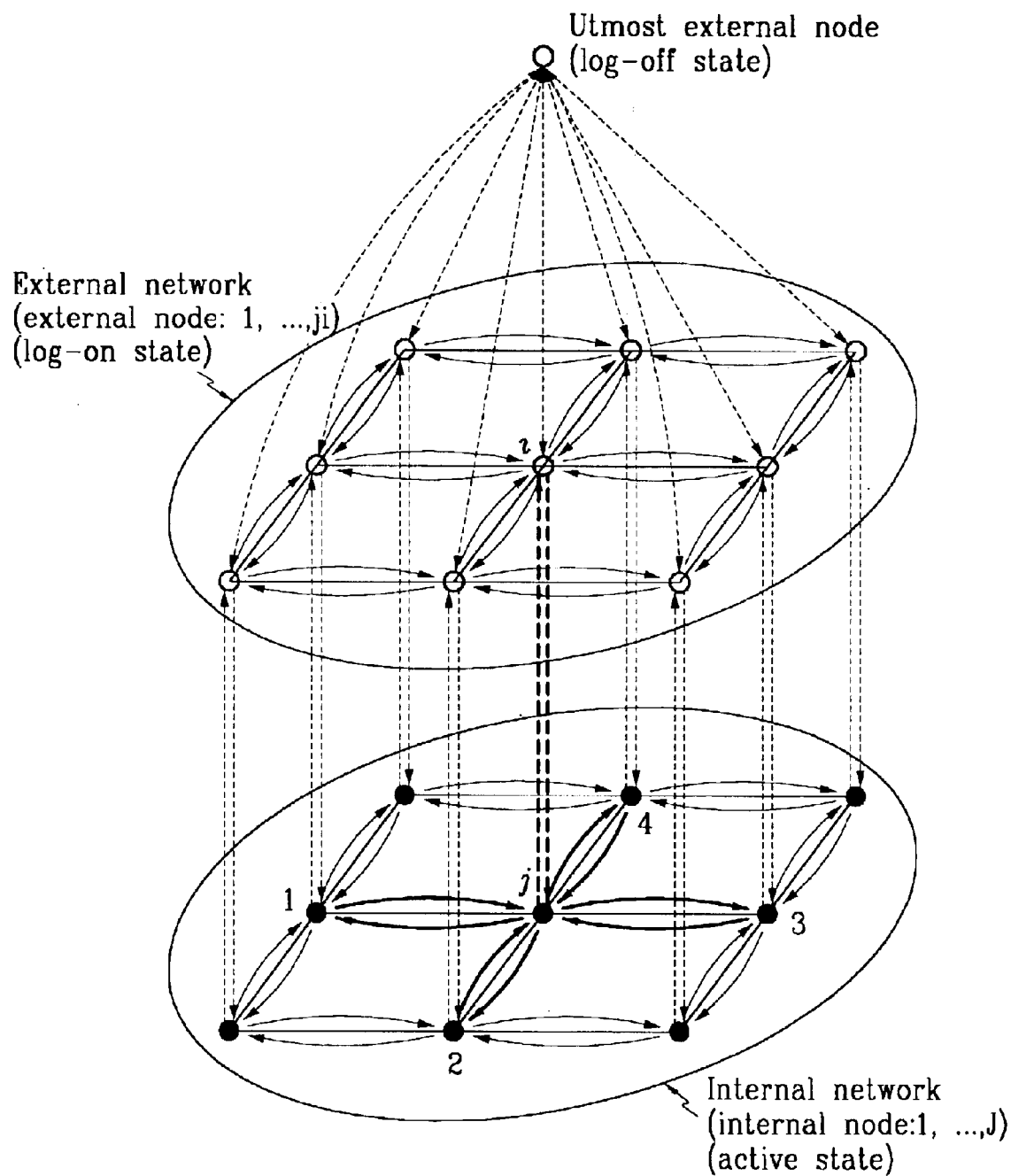
FIG. 2 is an explanatory view illustrating the conception of an open queuing network applied to the system for estimating a traffic rate of calls in wireless personal communication environments according to an embodiment of the present invention.

FIG. 2 is an explanatory view illustrating the conception of an open queuing network applied to the system for estimating a traffic rate of calls in wireless personal communication environments according to an embodiment of the present invention.

As shown in FIG. 2, the transition rates from an internal node i include transition rates to adjacent internal nodes 1, 2, 3, and 4 other than node 0 and transition rates to an adjacent external node i.

The transition rates between internal nodes in the actual communication systems correspond to change request rates by traffic classes, including "busy", "transmission speed", "transmission path" or the like. The transition rates between internal node and external node correspond to traffic rates of new calls generated by log-on users.

The open queuing network includes internal and external networks, each of which includes a limited number of nodes. A subscriber's being on a node included in the internal network, i.e., an internal node in the open queuing network, means that the subscriber's terminal is "active" in the physically corresponding area of that node. A subscriber's being on a node included in the external network, i.e., an external network means that the subscriber's terminal is logged on but not "active". Also, the meaning of a subscriber's being on the utmost external node is that the subscriber's terminal is logged out.

The transition request from the utmost external node to an external node means turning on the terminal, or "log_on". The transition request from an external node to an internal node means a new traffic demand, and success of the transition request means that new traffic is accepted on the internal node.

The transition request from an internal node to its adjacent internal node means a handover request, and success of the transition request means that the handover (e.g., hard handover, soft handover, softer handover, etc.) request is accepted on the target internal node.

Now, a description will be given of the operation of the above-constructed system for estimating a traffic rate of calls in wireless personal communication environments according to an embodiment of the present invention, with reference to the accompanying drawings.

Figure 3:
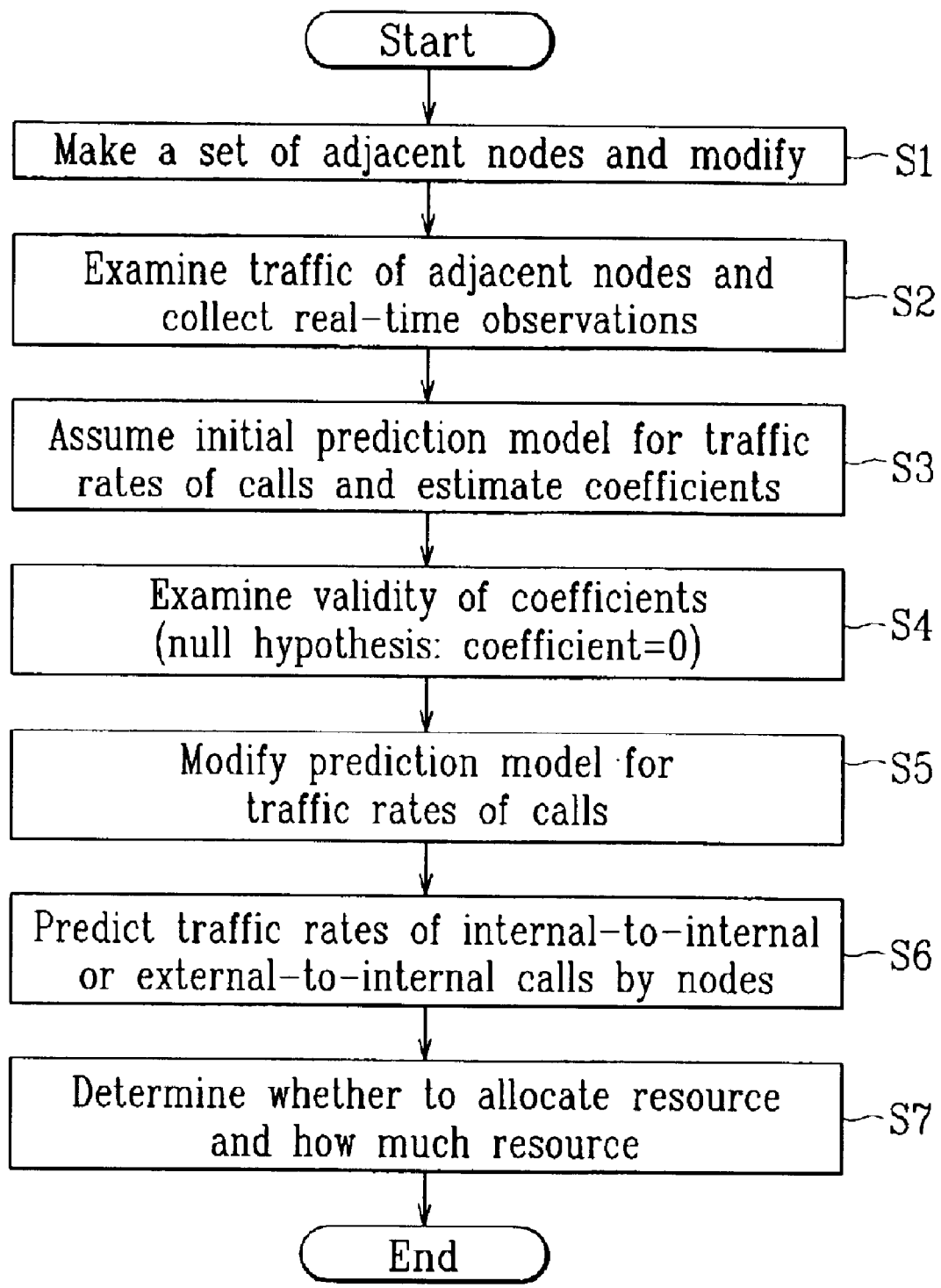
FIG. 3 is a flow chart showing a method for estimating a traffic rate of calls in wireless personal communication environments according to an embodiment of the present invention.

FIG. 3 is a flow chart showing a method for estimating a traffic rate of calls in wireless personal communication environments according to an embodiment of the present invention.

As shown in FIG. 3, assuming an open queuing network composed of an internal network having j nodes and an external network having the same number of nodes, a set of adjacent nodes is made and modified, in step 1.

In the set of adjacent nodes, traffic transition may occur among the internal nodes, or between each internal node and one external node pairing with the internal node on a one-to-one basis.

The traffic parameter observation module 10 examines the traffic status of the adjacent nodes, in step 2. Namely, the traffic parameter observation module 10 observes the number of active objects on the internal node for measurement in the actual propagation environments and the number of objects present on the external node.

The regression analysis module 20 then receives the observations from the traffic parameter observation module 10 to assume an initial prediction model for traffic rates of calls and to estimate each coefficient, in step 3.

The validity of the coefficient estimated above is examined with respect to the null hypothesis (coefficient=0) of the F-test, in step 4. The variables of coefficients that are found to be invalid in the test are deleted to modify the initial prediction model for traffic rates of calls, in step 5.

The regression analysis module 20 predicts traffic rates of internal-to-internal or external-to-internal calls by nodes using the modified prediction model for traffic rates of calls, and reports the predicted traffic rates of calls to the resource allocation control module 30, in step 6.

The resource allocation control module 30 then determines whether to allocate resources and how much of the resources to allocate according to the traffic rates of calls, in step 7.

The traffic rates of calls from the above prediction process are data obtained by most accurately predicting the frequency of traffic demands that intrinsically have uncertainty, to allow discriminative allocation of wireless resources for multimedia/multi-class traffic having priority, and which are provided as a reasonable source for determining whether to allocate the resources in the future or immediately.

Figure 4:
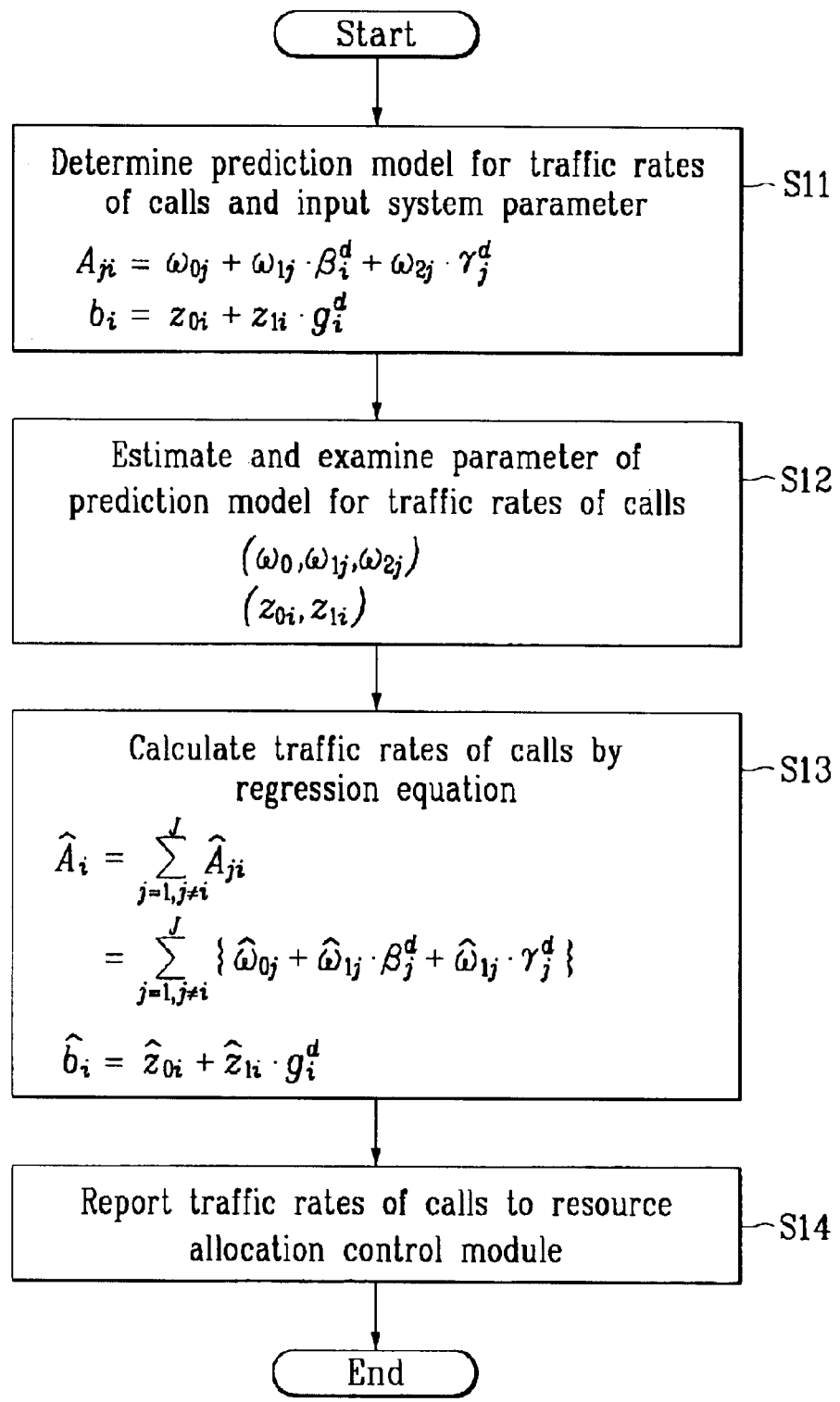
FIG. 4 is a flow chart showing a process for regression analysis and estimation of a regression analysis module as a component of the present invention.

FIG. 4 is a flow chart showing a process for regression analysis and estimation of the regression analysis module used as a component of the present invention.

As shown in FIG. 4, the regression analysis module 20 assumes a prediction model for traffic rates of calls and inputs system coefficient values, in step 11.

In this regard, the regression analysis module 20 receives past traffic parameter values $b_i$, $\beta_i$, $A_{ji}$, $\gamma_i$, and $g_i$ from the traffic parameter observation module 10, and predicts future traffic parameters $\omega_0$, $\omega_{1j}$, and $\omega_{2j}$, and $z_{0i}$ and $z_{1i}$.

The past traffic parameter values are data measurable in real time, where $b_i$ is a transition request rate from an external node i to an internal node i, and $\beta_i$ is a corresponding rate of accepted transitions of $b_i$, $A_i$ is a sum of transition request rates from each internal node j adjacent to the internal node i to the internal node i, and $\gamma_i$ is a corresponding rate of accepted transitions; $A_{ji}$ is a transition request rate from the internal node j to the internal node i; and $g_i$ is the number of objects present on the external node i (Here, the transition request rate corresponds to the traffic rate of calls, and the rate of accepted transitions means a rate of accepted requests to continue traffic on a new wireless link with allocated channels, on demand).

The individual traffic parameter values have the relationship as given by Equations 1 and 2:

$$\beta_i = b_i \cdot (1 - P_b) \qquad \text{[Equation 1]}$$

$$\gamma_i = A_i \cdot (1 - P_r) \qquad \text{[Equation 2]}$$

where $P_b$ represents a rate of accepted transitions from an external node to a node i; and $P_r$ represents a rate of accepted transitions from an internal node to a node i.

A transition request rate $\overline{A}_i$ from an internal node to an internal node i at a time t for a short time interval $\Delta t$ is given by Equation 3:

$$\overline{A}_i = \Delta t \cdot \sum_{j=1, j \neq i}^{J} A_{ji} \qquad \text{[Equation 3]}$$

-continued $$= \Delta t \cdot \left\{ \sum_{j=1, j \neq i}^{J} (\beta_j + \gamma_j) \cdot P_{ji}(\beta_j, \gamma_j) \right\}$$

where $P_{ji}(\beta_j, \gamma_j)$ is a probability of a transition request to an internal node j (j≠i) by a call when a transition to the node i as much as $(\beta_j, \gamma_j)$ is successful. This can be normalized in unit time and expressed as Equation 4:

$$A_i = \frac{1}{\Delta t} \cdot \overline{A}_i = \Delta t \cdot \left\{ \sum_{j=1, j \neq 1}^{J} (\beta_j + \gamma_j) \cdot P_{ji}(\beta_j, \gamma_j) \right\} \quad \text{[Equation 4]}$$

On the other hand, a transition request rate $b_i$ from an external node to an internal node i is given by Equation 5:

$$b_i = g_i \cdot R_i(g_i) \quad \text{[Equation 5]}$$

Referring to these equations, the regression equations for estimating traffic rates of internal-to-internal or external-to-internal calls can be expressed by Equations 6 and 7:

$$A_{ji} = \omega_{0,j} + \sum_{k=1}^{K_\beta} \omega_{1,j}(k) \cdot \beta_j^{d_\beta(k)} + \sum_{k=1}^{K_\gamma} \omega_{2,j}(k) \cdot \gamma_j^{d_\gamma(k)} \quad \text{[Equation 6]}$$

$$b_i = z_{0,i} + \sum_{k=1}^{K_g} z_{1,i}(k) \cdot g_i^{d_g(k)} \quad \text{[Equation 7]}$$

In Equations 6 and 7, d, $d_\beta$, and $d_\gamma$ are multipliers used to accurately estimate the influence of a variation of the explanatory variables used as observation data on dependent variables to be estimated.

Most preferably, the multipliers d, $d_\beta$, and $d_\gamma$ have an effective range of, if not limited to, from 1.0 to 3.0 (i.e., $1.0 \leq d, d_\beta, d_\gamma \leq 3.0$).

In Equation 6, the multipliers $d_\beta$ and $d_\gamma$ have a different value, or in some cases, the same value.

The multipliers d, $d_\beta$, and $d_\gamma$ have a limitation on the accuracy of the estimated variables due to the linearity of the prediction model for traffic rates of calls, which can be overcome by raising the explanatory variables (independent variables) to the second power to attain more accurate results of estimation than in a general regression model.

Namely, the multipliers d, $d_\beta$, and $d_\gamma$ are used as a means for making a model, and particularly in the range of 1 to 3, so as to cover one-, two-, and three-dimensional topographical arrangements of the individual nodes.

After estimating and examining the parameters of the prediction model for traffic rates of calls assumed in step 11, the traffic rates of calls are predicted according to the regression equations of Equations 6 and 7, in steps 12 and 13.

Namely, regression coefficients $\omega_0$, $\omega_{1,j}(k)$, $\omega_{2,j}(k)$, $z_{0,i}$, and $z_{1,i}(k)$ are estimated every time interval $T_{function}$ by using the observations as past traffic parameter values to determine a regression function.

Subsequently, prediction values $\hat{A}_{ji}$ and $\hat{b}_i$ are determined as future traffic parameter values by simple calculations with the current observations (i.e., explanatory variables) using Equations 6 and 7 whenever traffic occurs, thereby estimating the traffic rates of internal-to-internal or external-to-internal calls.

The time interval $T_{function}$ can be a predetermined unit time of, for example, one day (24 hours), one hour, or 30 minutes.

On the discrete time axis on which continuous time is divided into the same time intervals $\Delta t$, past traffic parameter values are measured every time interval and stored in a memory. The frequency of each transition request by type is then measured.

n observations for Equation 6 are collected and used to estimate $\omega_0$, $\omega_{1j}$, and $\omega_{2j}$, by the least squares method. Then estimator $\hat{A}_i$ for $A_i$ is calculated according to Equation 8.

The term "least squares method" as used herein means a method for calculating a function best representing observation data with observations measured in real time.

$$\hat{A}_i = \sum_{j=1, j \neq i}^{J} \hat{A}_{ji} = \hat{\omega}_{0j} + \hat{\omega}_{1j} \cdot \beta_j^{d_\beta} + \hat{\omega}_{2j} \cdot \gamma_j^{d_\gamma} \quad \text{[Equation 8]}$$

Additionally, n observations for Equation 7 are collected and used to estimate $z_{0i}$ and $z_{1i}$ by the least squares method. Then estimator $\hat{b}_i$ for $b_i$ is calculated according to Equation 9:

$$\hat{b}_i = \hat{z}_{0i} + \hat{z}_{1i} \cdot g_i^d \quad \text{[Equation 9]}$$

The regression analysis module 20 reports the traffic rates of calls predicted according to the above-mentioned equations to the resource allocation control module 30, in step 14.

The system and method for estimating a traffic rate of calls in wireless personal communication environments according to the embodiment of the present invention estimates traffic rates of calls, such as traffic rate of new calls, traffic rate of handovers, or capacity request rate of data for the respective classes, in a system providing wireless personal communication services to multiple users through multiple access nodes, and provides them to a serve system or a module requiring the information.

Accordingly, the system and method for estimating a traffic rate of calls in wireless personal communication environments according to the embodiment of the present invention is applicable to all wireless personal communication systems that support traffic transitions of the open queuing network, for example, interactive satellite Internet access systems with multi-class traffic support, multi-cell cellular communication systems, multi-beam cellular satellite communication systems, three-dimensional indoor environment wireless IP networks, etc.

In the interactive satellite Internet access system with multi-class traffic support, the multiple access nodes may be "active" user groups for the respective classes or "log-on" user groups, and the status of each access node may be the number of objects for the "active" users or for the "log-on" users. The multiple access nodes may be the individual cell, sector, or cluster in the cellular communication system, or the individual spot beam or its area in the cellular satellite communication system.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The system and method for estimating a traffic rate of calls in wireless personal communication environments according to the present invention accurately predicts traffic rates of calls using the number of objects being "active" and the number of objects present in a corresponding area as measured in the actual propagation environments by regression analysis using valid explanatory variables selected for estimating the traffic rates of calls, and provides the predicted traffic rates of calls as a reasonable source for optimized operation of sparse wireless resources.

The system and method for estimating a traffic rate of calls in wireless personal communication environments according to the present invention uses, as valid explanatory variables, data necessary for estimating the traffic rates of calls that is measurable in actual systems in a simple way, and it stores a process for estimating traffic rates of calls in a recording medium to readily utilize the traffic rates of calls for the operation of systems.

Additionally, The system and method for estimating a traffic rate of calls in wireless personal communication environments according to the present invention effectively performs wireless resource allocation in an open queuing network with multi-class service support, thereby providing basic information for decision-making to overcome short-term performance deterioration and to secure long-term performance enhancement.

What is claimed is:

1. A system for estimating a traffic rate of calls in wireless personal communication environments, comprising:
   a traffic parameter observation module for making a set of adjacent nodes in an open queuing network and collecting real-time observations for observing the number of active objects on each node and the number of objects present in a corresponding area;
   a regression analysis module for performing a regression analysis of the observations collected by the traffic parameter observation module to assume a prediction model for traffic rates of calls and to estimate traffic rates of internal-to-internal or external-to-internal calls; and
   a resource allocation control module for determining whether to allocate resources and how much of the resources to allocate according to the traffic rates of internal-to-internal or external-to-internal calls estimated by the regression analysis module.

2. The system as claimed in claim 1, wherein the set of adjacent nodes made by the traffic parameter observation module includes three sets of nodes, "log_off", "log_on", and "active", defining the status of communication terminal equipment.

3. The system as claimed in claim 1, wherein the traffic parameter observation module uses, as the real-time observations, a transition request rate $b_i$ from an external node i to an internal node i and a corresponding rate of accepted transitions $\beta_i$, a transition request rate $A_i$ from the internal node i to the external node i and a corresponding rate of accepted transitions $\gamma_i$, a transition request rate $A_{ji}$ from each internal node j adjacent to the internal node i to the internal node i, and the number of objects $g_i$ logged on the external node i.

4. The system as claimed in claim 1, wherein the regression analysis module assumes the prediction model for traffic rates of calls, estimates regression coefficients $\omega_0$, $\omega_{1,j}(k)$, $\omega_{2,j}(k)$, $z_{0,i}$, and $z_{1,i}(k)$ every time interval $T_{function}$ by using the observations collected by the traffic parameter observation module as past traffic parameter values to determine a regression function and then determine prediction values $\hat{A}_{ji}$ and $\hat{b}_i$ as future traffic parameter values by regression analysis using current observations whenever traffic occurs, thereby estimating the traffic rates of internal-to-internal or external-to-internal calls, and examines the validity of the individual coefficients.

5. The system as claimed in claim 4, wherein the regression analysis module determines estimators $\hat{A}_{ji}$ and $\hat{b}_i$ for the traffic rates of internal-to-internal or external-to-internal calls $A_{ij}$ and $b_i$ using the following regression equations, for estimating traffic rates of calls:

$$A_{ji} = \omega_{0,j} + \sum_{k=1}^{K_\beta} \omega_{1,j}(k) \cdot \beta_j^{d_\beta(k)} + \sum_{k=1}^{K_\gamma} \omega_{2,j}(k) \cdot \gamma_j^{d_\gamma(k)}$$

$$b_i = z_{0,i} + \sum_{k=1}^{K_g} z_{1,i}(k) \cdot g_i^{d_g(k)}$$

wherein $b_i$, $\beta_i$, $A_{ji}$, $\gamma_i$, and $g_i$ are past traffic parameter values; $\omega_0, \omega_{1,j}(k)$, and $\omega_{2,j}(k)$, and $z_{0,j}$ and $z_{1,i}(k)$ are regression coefficients for each explanatory variable of the regression equations; and d, $d_\beta$, and $d_\gamma$ are multipliers used to accurately estimate the influence of a variation of the explanatory variables used as observation data on dependent variables to be estimated.

6. The system as claimed in claim 5, wherein the multipliers d, $d_\beta$, and $d_\gamma$ in the regression equations have an effective range of 1.0 to 3.0.

7. The system as claimed in claim 1, wherein the resource allocation control module controls pairs of an internal node and an external node.

8. A method for estimating a traffic rate of calls in wireless personal communication environments, comprising the steps of:
   (a) making a set of adjacent nodes in an open queuing network and examining the traffic status of the adjacent nodes;
   (b) performing a regression analysis using the examination result of step (a) as observations to determine a prediction model for traffic rates of calls and estimating each coefficient of the prediction model;
   (c) examining the validity of each coefficient estimated in step (b) and modifying the prediction model for traffic rates of calls; and
   (d) predicting the traffic rates of calls using the prediction model modified in step (c) and the traffic status data estimated from the prediction model.

9. The method as claimed in claim 8, further comprising the step of determining whether to allocate resources and how much of the resources to allocate according to the traffic rates of calls predicted in step (d).

10. The method as claimed in claim 9, wherein step (a) of making a set of adjacent nodes includes defining the status of communication equipment as three sets of node, "log_off", "log_on", and "active".

11. The method as claimed in claim 8, wherein step (a) of examining the traffic status of the adjacent nodes includes using, as real-time observations, a transition request rate $b_i$ from an external node i to an internal node i and a corresponding rate of accepted transitions $\beta_i$, a transition request rate $A_i$ from the internal node i to the external node i and a corresponding rate of accepted transitions $\gamma_i$, a transition request rate $A_{ij}$ from the internal node i to an internal node j, and the number of objects $g_i$ present on the external node i.

12. The method as claimed in claim 8, wherein step (b) of estimating each coefficient of the prediction model for traffic rates of calls includes:
   (b-1) estimating regression coefficients $\omega_0$, $\omega_{1,j}(k)$, $\omega_{2,j}(k)$, $z_{0,i}$, and $z_{1,i}(k)$ every time interval $T_{function}$ by using the observations as past traffic parameter values to find a regression function; and
   (b-2) determining prediction values $\hat{A}_{ji}$ and $\hat{b}_i$ as future traffic parameter values by regression analysis using current observations whenever traffic occurs, thereby estimating traffic rates of internal-to-internal or external-to-internal calls.

13. The method as claimed in claim 8, wherein step (d) of predicting the traffic rates of calls includes determining estimators $\hat{A}_{ij}$ and $\hat{b}_i$ for the traffic rates of internal-to-internal or external-to-internal calls $A_{ij}$ and $b_i$ using the following regression equations for estimating traffic rates of calls:

$$A_{ji} = \omega_{0,j} + \sum_{k=1}^{K_\beta} \omega_{1,j}(k) \cdot \beta_j^{d_\beta(k)} + \sum_{k=1}^{K_\gamma} \omega_{2,j}(k) \cdot \gamma_j^{d_\gamma(k)}$$

-continued $$b_i = z_{0,i} + \sum_{k=1}^{K_g} z_{1,i}(k) \cdot g_i^{d_g(k)}$$

wherein $b_i$, $\beta_i$, $A_{ji}$, $\gamma_i$, and $g_i$ are past traffic parameter values; $\omega_0$, $\omega_{1,j}(k)$ and $\omega_{2,j}(k)$, and $z_{0,i}$ and $z_{1,i}(k)$ are regression coefficients for each explanatory variable of the regression equations; and d, $d_\beta$, and $d_\gamma$ are multipliers used to accurately estimate the influence of a variation of the explanatory variables used as observation data on dependent variables to be estimated.

14. The method as claimed in claim 13, wherein the multipliers d, $d_\beta$, and $d_\gamma$ have an effective range of 1.0 to 3.0.

* * * * *